United States Patent
Norberg Ohlsson

(10) Patent No.: US 10,459,421 B2
(45) Date of Patent: Oct. 29, 2019

(54) METHOD OF PREPARING A CUTTING PATH FOR MACHINE CUTTING

(71) Applicant: Tomologic AB, Stockholm (SE)

(72) Inventor: Magnus Norberg Ohlsson, Stockholm (SE)

(73) Assignee: Tomologic AB, Stockholm (SE)

( * ) Notice: Subject to any disclaimer, the term of this patent is extended or adjusted under 35 U.S.C. 154(b) by 207 days.

(21) Appl. No.: 15/556,726

(22) PCT Filed: Mar. 14, 2016

(86) PCT No.: PCT/EP2016/055402
§ 371 (c)(1),
(2) Date: Sep. 8, 2017

(87) PCT Pub. No.: WO2016/146563
PCT Pub. Date: Sep. 22, 2016

(65) Prior Publication Data
US 2018/0107189 A1    Apr. 19, 2018

(30) Foreign Application Priority Data

Mar. 13, 2015  (WO) ................. PCT/EP2015/055302
Jan. 28, 2016  (EP) .................................... 16153196

(51) Int. Cl.
*G05B 19/19*    (2006.01)

(52) U.S. Cl.
CPC .... *G05B 19/19* (2013.01); *G05B 2219/35066* (2013.01); *G05B 2219/35162* (2013.01); *G05B 2219/36199* (2013.01)

(58) Field of Classification Search
CPC .............. G05B 19/19; G05B 19/40937; G05B 2219/35066; G05B 2219/35162; G05B 2219/36199; Y02P 90/265
See application file for complete search history.

(56) References Cited

U.S. PATENT DOCUMENTS

2002/0092389 A1*  7/2002  Feldman ................. B26D 5/00
                                                  83/49
2009/0108792 A1*  4/2009  Fagan .................... B23K 7/105
                                                  318/568.1
(Continued)

FOREIGN PATENT DOCUMENTS

JP       2005-334919 A    12/2005
WO    WO 2011/042058 A1    4/2011

OTHER PUBLICATIONS

Gabriela Buchfink: "Fascination of Sheet Metal", Jan. 1, 2006 (Year: 2006).*

(Continued)

*Primary Examiner* — Yuhui R Pan
(74) *Attorney, Agent, or Firm* — Blank Rome LLP

(57) ABSTRACT

The invention relates to methods and systems for preparing a cutting path for machine cutting of a plurality of parts from a sheet material using beam cutting technology. Each one of the plurality of parts is formed by one of a plurality of two dimensional free form shapes, comprising at least a first shape. The method comprises a step of identifying at least one segment of the first shape, which segment prevents a part of the first shape to be positioned and cut so close to another shape in the plurality of shapes so that only one cut of the cutting beam is found between the parts. The method further comprises a step of modifying the segment to provide a modified first shape. The modified first shape comprises a modified segment, which is configured such that the modified segment allows a part of the first shape to be positioned so close to another shape in the plurality of shapes so that only one cut of the cutting beam is found between the parts whenever the shape of the parts allows it.

11 Claims, 4 Drawing Sheets

(56) References Cited

U.S. PATENT DOCUMENTS

| | | | |
|---|---|---|---|
| 2011/0046766 A1* | 2/2011 | Mienhardt | G05B 19/4083 |
| | | | 700/103 |
| 2012/0109352 A1 | 5/2012 | Himeno et al. | |
| 2012/0192690 A1* | 8/2012 | Norberg Ohlsson | B23K 26/38 |
| | | | 83/13 |
| 2015/0127131 A1* | 5/2015 | Herrman | G05B 19/4097 |
| | | | 700/98 |

OTHER PUBLICATIONS

S. K. Gupta et al., "Automated Manufacturability Analysis: A Survey," Research in Engineering Design, Jan. 1, 1997, pp. 168-190.

G. Buchfink, "Fascination of Sheet Metal," Vogel Buchverlag, Würzburg, Germany, Jan. 1, 2006, pp. 26-47.

M. Z. Lagerkvist et al., "Laser Cutting Path Planning Using CP," Springer-Verlag, Berlin Heidelberg, Germany, Sep. 16, 2013, pp. 790-804.

Metal Handbook, Ninth Edition, vol. 6, "Welding, Brazing, Soldering", American Society for Metals, p. 1192, Mechanical Industry Press (1983).

* cited by examiner

METHOD OF PREPARING A CUTTING PATH FOR MACHINE CUTTING

TECHNICAL FIELD

The invention relates to a method of preparing a cutting path for machine cutting of a plurality of parts from a sheet material using beam cutting technology and a corresponding system.

BACKGROUND

There are various cutting technologies known to cut parts out of a piece of material and the present invention relates to what here is called beam cutting technology. Beam cutting is defined as having some kind of beam as the cutting means, such as laser cutting, plasma cutting, ion beam cutting, flame or torch cutting, water cutting, pellet cutting or air cutting. This is not to be confused with mechanical cutting where the cutting means is a mechanical member such as a cutting blade or a rotating cutting head.

It is traditionally known to use a work plan optimization tool based on nesting part placement methods to place out the parts that are to be cut out of a piece of material. As commonly used today, a set of parts cut by a beam cutting technology is cut by making a complete contour around each individual part. Each part needs to be designed by the constructor such that it may be cut as a separate part and positioned with a safety distance to adjacent parts during cutting. With such traditional cutting methods it is not possible to place the parts close to each other without any safety distance, since this would result in the cutting beam cutting the same cut twice, whereby the parts would risk being deformed, damaged or the tolerances not met. The size of the safety distances varies depending on used material and used cutting technology, but a normal safety distance between parts is 5-20 mm.

Thus, with any kind of beam cutting technology there is a huge problem with waste, and a normal production reliable cutting plan results in 20-50 percent waste. It is thus desirable to minimize the distance between adjacent parts in order to reduce the waste material.

In WO 2011/042058 A1 a method is disclosed for machine cutting of several parts out of a piece of material using a beam cutting technology. The invention disclosed therein provides a set of controlling rules and variables for forming of a cluster of parts with free form shapes, the parts being positioned so close to each other so that one cut from the cutting beam is found between adjacent parts whenever the shape of said parts allows it. This method reduces the need of safety distances between individual parts and thus reduces the waste material between the parts substantially.

SUMMARY OF THE INVENTION

It is an object of the present invention to improve the possibility of making use a beam cutting technology where only the thickness of one cut from the cutting beam is found between adjacent parts whenever the shape of said parts allows it. Thus is an object of the invention to further improve the cutting of clusters of free form shapes and reducing scrap in the cutting process.

Thus the invention relates to a method of preparing a cutting path for machine cutting of a plurality of parts from a sheet material using beam cutting technology. Each one of the plurality of parts is formed by one of a plurality of two dimensional free form shapes, comprising at least a first shape. The method comprises a step of identifying at least one segment of the first shape, which segment prevents or makes it difficult for a part of the first shape to be positioned and cut so close to another shape in the plurality of shapes so that only one cut of the cutting beam is found between the parts. Preventing or making it difficult should be interpreted as making it difficult to cut the parts without damaging or deforming the part or not keeping sought tolerances of the part. Typically, it is identified that, in one way or another, an interference will occur of an influential zone of the cutting beam, which interference may have a negative effect on the cut parts. The method further comprises a step of modifying the segment to provide a modified first shape. The modified first shape comprises a modified segment, which is modified with respect to the identified segment such that the modified segment allows a part of the first shape to be positioned and cut so close to another shape in the plurality of shapes so that only one cut of the cutting beam is found between the parts whenever the shape of the parts allows it. The modifying is typically made in order to decrease the negative effect of the interfering influential zone.

By identifying such at least one segment which would prevent the cutting of two adjacent parts with a separating distance corresponding to the width of one cut of the cutting beam, the segment may be modified into a segment that allows the parts to be separated with only one cut of the cutting beam. The problems of positioning shapes with the distance of the width of one cut with the cutting beam will arise first when actually cutting the parts and not during the step of positioning the shapes for preparing the cutting path.

Advantages of the invention is that it may reduce the amount of waste material during cutting, save valuable processing time during cutting, and save valuable time during construction of parts and programming of cutting machines.

In a specific embodiment of the invention, the cutting path is adapted so as to decrease or minimize the interference of the influential zone. An interference of the influential zone may be defined to occur when the cutting path is such that a cut will be made within the influential zone of another cut. Such cuts may produce a negative effect on the cut parts and an object of the invention is to reduce such negative effects. According to this specific embodiment the step of identifying at least one segment of the first shape, which segment prevents or makes it difficult for a part of the first shape to be positioned and cut so close to another shape in the plurality of shapes so that only one cut of the cutting beam is found between the parts may be defined as identifying that cutting of said segment of the first shape risk to generate interference of the influential zone of the cutting path.

As an example the at least one segment of the first shape may comprise a radial segment having an extension which is smaller than the influential zone of the cutting beam. A radial segment may result in cutting paths in the form of pockets when the shape is positioned as close as possible to another part (i.e. at a distance corresponding to the width of one cut of the cutting beam wherever this is made possible by the shape of adjacent parts). If the radial segment has an extension smaller than the influential zone of the beam this may result in the pockets being so narrow that they are difficult to cut without damaging the parts being cut.

The segment may be modified by replacing the radius (i.e. radial segment) with an angle or a chamfer. Thus the problem with pockets may be avoided or reduced.

The segment may be modified by increasing the radius. Thus the extension of any such pockets may be increased to a size which is possible to cut without damaging, or with no or acceptable influence on the parts being cut.

In another example the at least one segment of the first shape may comprise a chamfer segment having an extension which is smaller than an influential zone of the cutting beam. A chamfer segment may result in cutting paths in the form of pockets when the shape is positioned as close as possible to another part (i.e. at a distance corresponding to the width of one cut of the cutting beam wherever this is made possible by the shape of adjacent parts). If the chamfer segment has an extension smaller than the influential zone of the beam this may result in the pockets being so narrow that they are difficult to cut without damaging the parts being cut.

The segment may be modified by replacing the chamfer with an angle or a radius. Thus the problem with pockets may be avoided or reduced.

The segment may be modified by increasing the extension of the chamfer. Thus the extension of any such pockets may be increased to a size which is possible to cut without, or with acceptable influence on the parts being cut.

The at least one segment may comprise a cut-out having an extension which is smaller than an influential zone of the cutting beam. Such a cut-out may result in pockets being so narrow that they are difficult to cut without any detrimental damage to the parts being cut.

The segment may be modified by removing the cut-out. Thereby the problem with cutting the pockets may be removed.

The segment may be modified by increasing the extension of the cut-out. Thus the extension of any such pockets may be increased to a size which is possible to cut without, or with acceptable influence on the parts being cut.

The at least one segment may comprise a protrusion from the shape. Such protrusions may render it difficult to position and cut the shape at a distance corresponding to the width of one cut of the cutting beam. If the protrusion or protrusions have an extension out from the shape being smaller than the influential zone of the beam, they may result in pockets being so narrow that they are difficult to cut without any detrimental damage to the parts being cut.

The segment may be modified by removing the protrusion. Thereby the shape may be positioned and cut closer to an adjacent part, and any pocket caused by the protrusion may be removed.

The at least one segment may comprise a non-straight line. Such a non-straight line may render it difficult to position and cut the shape at a distance corresponding to the width of one cut of the cutting beam. If the non-straight line extends in a direction out from the shape, and this extension is smaller than the influential zone of the beam, it may result in pockets being so narrow that they are difficult to cut without any detrimental damage to the parts being cut.

The segment may be modified by replacing the non-straight line with a straight line. Thereby the shape may be positioned and cut closer to an adjacent part, and any pocket caused by the non-straight line may be removed.

The at least one segment may comprise a segment which is shortened to reduce an extension of the first shape in at least one direction. Thus the first part may be modified to fit onto a material of a predetermined sheet size to reduce the waste produced during cutting.

The at least one segment may comprise a segment which is extended to increase an extension of the first shape in at least one direction. Thereby the material of a predetermined sheet size may be used more efficiently to reduce the waste produced during cutting.

As explained above a cutting beam will have an influential zone. The extension of the influential zone is a factor depending on the material being cut, the thickness of the material being cut, the type of beam cutting technology and processing variables of the cutting beam, such as cutting speed. The extension of the influential zone may be determined by the skilled person, by consulting common general knowledge or by routine experiments. The extension of the influential zone may be larger than the width of one cut with the cutting beam, and/or may be smaller than three times the width of one cut with the cutting beam. Thus the extension of the influential zone may be within the range of 1 to 3 times the width of one cut of the cutting beam. The extension of the influential zone may be larger than a thickness of the sheet material, and may be less than ten times the thickness of the sheet material. Thus the extension of the influential zone may be within the range of 1 to 10 times a thickness of the sheet material. As one example the extension of the influential zone may be set in the range between the precision of the cutting machine (e.g. 0.001 mm) to ten times the material thickness of the sheet material.

The method may comprise identifying and modifying a plurality of segments of the at least one first shape. Thus a plurality of different or similar segments on the at least one first shape may be identified and modified, sequentially or simultaneously.

The method may comprise repeating the identification of at least one segment for several of the plurality of shapes, and modifying at least one segment for several of the plurality of shapes. Thus segments on several shapes forming a cluster may be identified and modified to reduce waste in the cluster during cutting.

The method may comprise positioning a plurality of two dimensional free form shapes in a cluster comprising at least the modified first shape, so close to each other so that only the thickness of one cut of the cutting beam is found between adjacent parts whenever the shape of the parts allows it, and preparing a cutting path for cutting the plurality of parts in the cluster.

In one embodiment of the method a specific segment of a part may be tagged to be protected from influence of an influential zone, wherein the method will involve a step of ensuring that said segment may be cut with a minimum of such influence. For instance, the segment may be tagged such that an extended allowable margin of the influential zone may be defined for said segment. The extended allowable margin of the influential zone is hence bigger than a corresponding allowable margin of the influential zone for the remaining segments and parts to be cut. In other words, the allowed distance to an adjacent cut shall be greater for such a tagged segment. In another example any such tagged segment may be located with a normal safety distance to any other segments. Hence, in such a case, a certain interference of the influential zone may be allowed for segments that are not tagged.

The method may be implemented in a computer for automatic identification of the shapes. For example the method may be implemented as a tool for computer aided design (CAD) or computer aided manufacturing (CAM). The method may be implemented as a tool in a computer numerical control (CNC) system.

The invention further relates to a system for preparing a cutting path for machine cutting of a plurality of parts from a sheet material using beam cutting technology, wherein each one of the plurality of parts is formed by one of a plurality of two dimensional free form shapes, comprising at least a first shape, the system comprises;

processing means configured for identifying at least one segment of the first shape, which segment render it difficult to position the first shape so close to another shape of the plurality of shapes so that only one cut of the cutting beam is found between the parts formed by the shapes, the processing means further being configured for modifying the segment to be able to position and cut the first shape so close to another shape in the plurality of shapes so that only one cut of the cutting beam is found between the parts formed by the shapes whenever the shapes allows it, and providing a cutting path for cutting a cluster of parts formed by free form shapes, comprising at least the first shape with the at least one segment being modified.

The processing means of the system for preparing a cutting path may further be configured for performing the method as disclosed herein.

The invention further relates to a system for machine cutting several parts out of a piece of material, comprising a beam cutting device, a control unit, and a system for preparing a cutting path as disclosed herein, wherein the control unit is configured for controlling the beam cutting device according to the cutting path thus prepared.

Thus the system may be used to improve the cutting of parts by identifying and modifying segments which would make it difficult to cut the parts in the form of clusters. Thereby the amount of waste may and the cutting time may be reduced.

The invention further relates to a computer program product comprising computer program code, which when executed enables a processor in a computer to perform the method disclosed herein.

The invention further relates to a non-transient computer-readable medium or media comprising data representing coded instruction sets configured for execution by a processor in a computer, the instructions comprising the method as disclosed herein.

BRIEF DESCRIPTION OF DRAWINGS

Various embodiments and examples related to the invention will now be described with reference to the appended drawing, where.

DETAILED DESCRIPTION OF EMBODIMENTS

Figure 1:
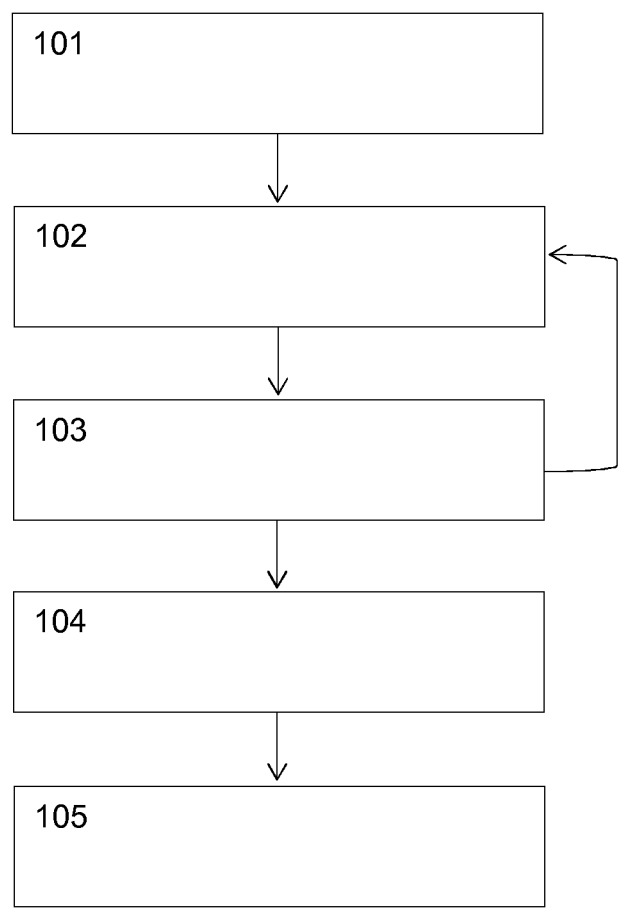
FIG. 1 shows a schematic illustration of a method of preparing a cutting path for machine cutting of a plurality of parts and cutting the plurality of parts by beam cutting.

In FIG. 1 a method of preparing a cutting path for machine cutting of a plurality of parts and cutting the plurality of parts out of a sheet material using beam cutting technology is shown schematically.

Each one of the plurality of parts has a two dimensional free form shape, meaning that the shape may have any shape and in particular not limited to simple shapes such as rectangular, triangular shapes etc. The shapes of the plurality of parts may be different or may be the same. In any case the shapes of the plurality of parts comprises at least a first shape.

The method comprises in general the steps of providing 101 one or more two dimensional free form shapes comprising at least a first shape, identifying 102 at least one segment of the at least one first shape which makes clustering of parts formed by the shapes difficult, modifying 103 the identified segment to overcome the problem. Possibly the steps of identifying and modifying segments of one or more of the plurality of shapes are repeated until no more such segments may be identified. Thereafter a cluster of shapes are formed 104 so that only one cut of the cutting beam is found between the parts whenever the shapes of the parts allows it followed by cutting 105 the parts out of a sheet material using beam cutting technology.

The step 102 of identifying at least one segment of the at least one first shape identifies a segment which prevents a part of the at least one first shape to be positioned and cut so close to another shape in the plurality of shapes so that only one cut of the cutting beam is found between the parts. Typically, the cut is prevented from being made due to unwanted influence of the influential zone of at least one cut. This may be the case if the segment is such that it will produce a pocket between the first part and another part in the plurality of parts, which pocket has an extension which is smaller than an influential zone of the cutting beam.

The extension of the influential zone is depending on the material being cut, the thickness of the material being cut, the type of beam cutting technology and/or processing variables of the cutting beam, such as cutting speed, etc. The extension of the influential zone may be determined by the skilled person, by consulting common general knowledge or by routine experiments. The influential zone may be depending on the lag of the cutting beam when moving and cutting through a sheet of material. This lagging may result in deformations on the parts which makes the final quality or tolerances of the part unacceptable. For thermal beam cutting technologies, e.g. laser cutting, plasma cutting etc., the influential zone may correspond to the heat affected zone. The heat affected zone is the area of material, (such as a metal or a thermoplastic), which is not melted and has had its microstructure and properties altered by the cutting operations. When cutting a pocket having an extension corresponding to the extension of the heat affected zone, thermal energy absorbed by the material will accumulate and the temperature of the material in the region of the pocket will increase. This may lead to material melting or deforming by heating in the region surrounding the pocket, to a degree where the part is damaged and needs to disposed as scrap. Also piercings (e.g. for cutting pockets) in the material may provide an influence of a region around the piercing, in the form of a crater and/or local changes in material properties. Thus there will be an influential zone around such piercings which may affect the cutting.

When such a segment is identified the method determines a modified segment which solves the problem of making it difficult to position and cut the part of the at least one first shape so close to another shape in the plurality of shapes so that only one cut of the cutting beam is found between the parts. The modified segment may be proposed to an operator, e.g. a constructor, before modifying the at least one first part to form the modified first part.

Thereafter the segment of the at least one first shape is modified to provide a modified first shape, comprising the modified segment. As described above this modified segment is configured such that it allows a part of the modified first shape to be positioned so close to another shape in the plurality of shapes so that only one cut of the cutting beam is found between the parts whenever the shape of the parts allows it. Typically, the segment is modified such that interference of the influential zone is decreased.

Typically, the method comprises iterative identifying and modifying a plurality of segments of the first shape, i.e. repeating the identification and modification for several segments on each part.

The method may typically also comprise repeating the identification of at least one segment for several of the plurality of shapes. If one or more such segments are identified for one or more of the plurality of shapes the method comprises modifying at least one segment such shape or shapes.

When at least one modified shape is provided, a plurality of two dimensional free form shapes, comprising at least the modified first shape, is positioned in a cluster so close each other so that only the thickness of one cut of the cutting beam is found between adjacent parts whenever the shape of the parts allows it, and a cutting path for cutting the plurality of parts in the cluster is prepared.

The cluster of shapes is then cut by a beam cutting technology, following the cutting path prepared in the previous step. Thereby a plurality of parts is cut from the sheet material in a way which reduces waste and often cutting time when compared with the initial set of parts comprising at least one segment which would prevent the parts to be positioned at a distance from each other corresponding to the width of one cut with the cutting beam.

Figure 2:
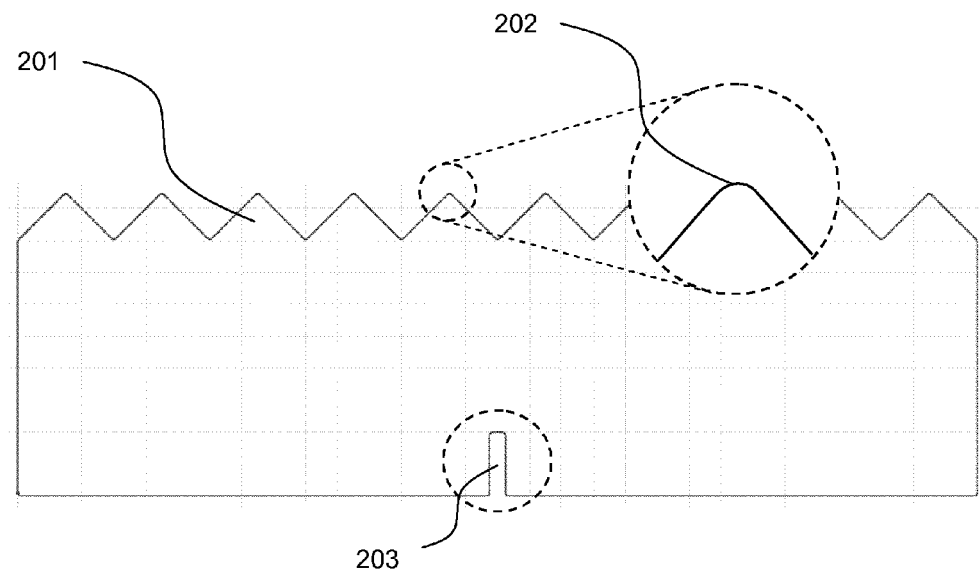
FIG. 2 shows an example of a shape where several segments are identified which, each one, would prevent the shape to be positioned and cut with the distance of only one cut of the cutting beam found between the parts.

To illustrate the method disclosed herein an example of a shape 201 for a part is shown in FIG. 2. This part has a free form shape with several angles, radii and cut-outs. The triangular teeth on the upper portion in the figure are provided with rounded edges by small radial segments 202 in the indicated region (dotted, see enlarged portion). On the lower portion of the shape in the figure a cut-out 203 is provided, which has a lateral (i.e. sideways) extension that is small.

If the shape for the part as shown in FIG. 2 was to be positioned as close as possible to another (in this case similar) part in the plurality of parts, the small radial segment would result in a small pocket which would be difficult to cut with a beam cutting technology without deforming or damaging the part or providing a part where the manufacturing tolerances are not met.

Figure 3:
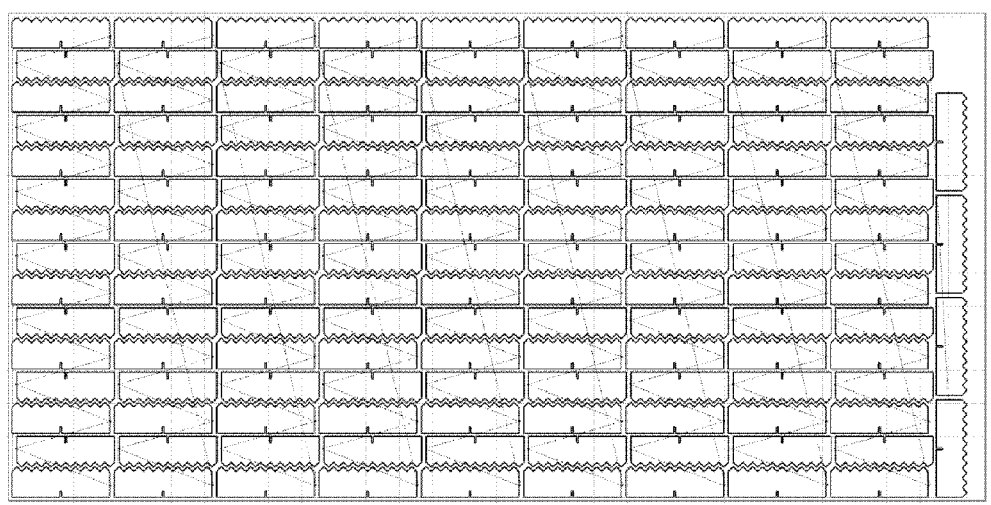
FIG. 3 shows an example of a resulting positioning of a plurality of shapes as shown in FIG. 1.

Thus, if a plurality of shapes as shown in FIG. 2 is to be placed and cut as close as possible to another, they cannot be placed at a distance from each other corresponding to the width of one cut with the cutting beam. Instead a resulting placement which will lead to reliable cutting is exemplified in FIG. 3. In this case no clusters of parts may be formed, thereby creating a skeleton of waste material extending throughout the sheet.

In the shape in FIG. 2, radial segments 202 having an extension smaller than an influential zone of the cutting beam (which thus may cause problems in the step of clustering due to formation of pockets having an extension in one or more directions being smaller than an influential zone of the beam) are identified. Further to this, the cut-out 203 having an extension smaller than an influential zone of the beam in one of its directions is identified as a segment.

To overcome these problems the method proposes to modify the radial segments 202 into angle segments. The method further proposes to modify the cut-out 203 by extending it in the direction which is smaller than an influential zone of the beam.

Figure 4:
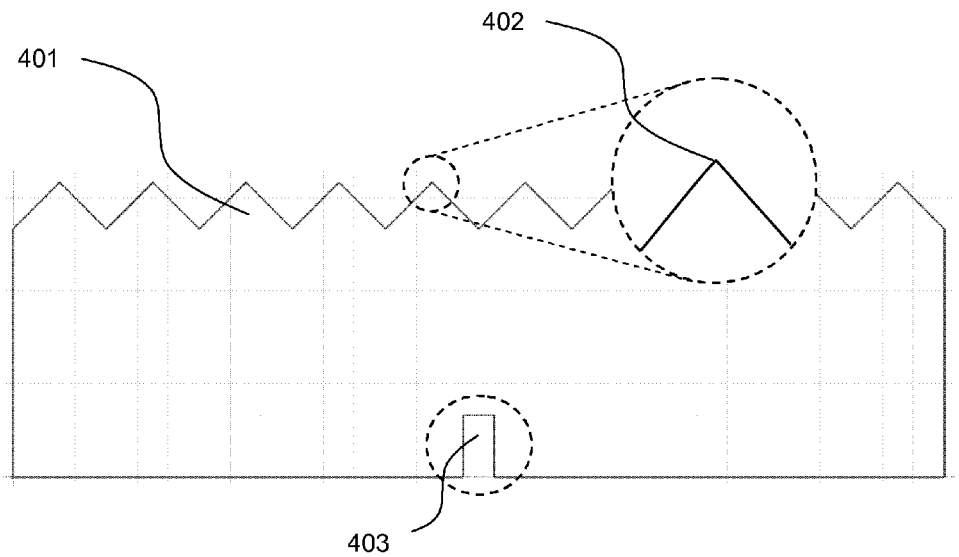
FIG. 4 shows an example of a shape as shown in FIG. 1, where the identified segments are modified into segments which allow the shape to be positioned and cut with the distance of only one cut of the cutting beam found between the parts.

Thus the shape is modified into the shape 401 shown in FIG. 4. In this figure the shape has angle segments 402 in the triangular teeth on the upper portion, and a cut-out 403 in the lower portion which has an extension larger than the influential zone of the beam.

Figure 5:
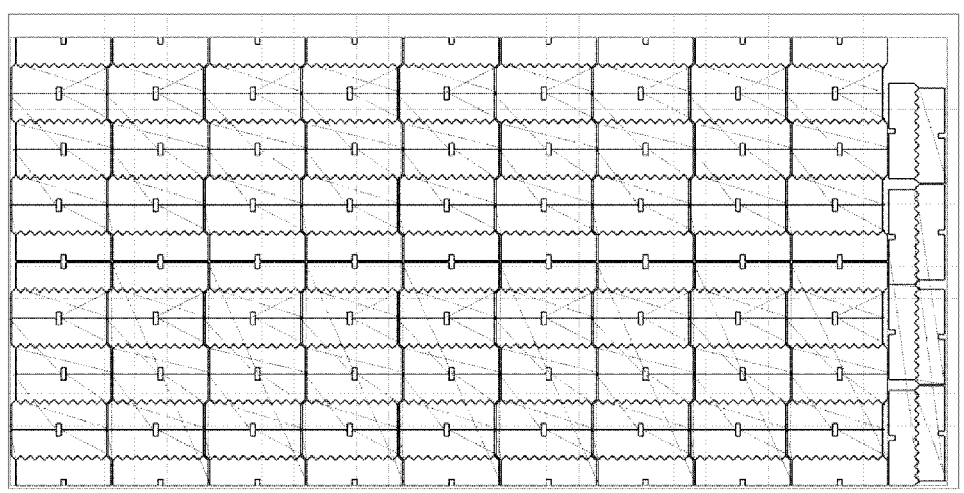
FIG. 5 shows an example of a resulting positioning of a plurality of shapes as shown in FIG. 2.

Thus, if a plurality of shapes as shown in FIG. 4 are to be placed and cut as close as possible to another, i.e. with a distance of the width of one cut with the beam, the resulting cutting plan is shown in FIG. 5. Now the shapes may be placed in clusters which may be separated by cutting only one cut with the cutting beam, whereby the waste material between adjacent parts is minimized. Further to this, the time to cut the plurality of parts is reduced when comparing to the example shown in FIG. 3. The saving in material is 8.6% in the example shown, and the cutting time is reduced by 20%.

Figure 6:
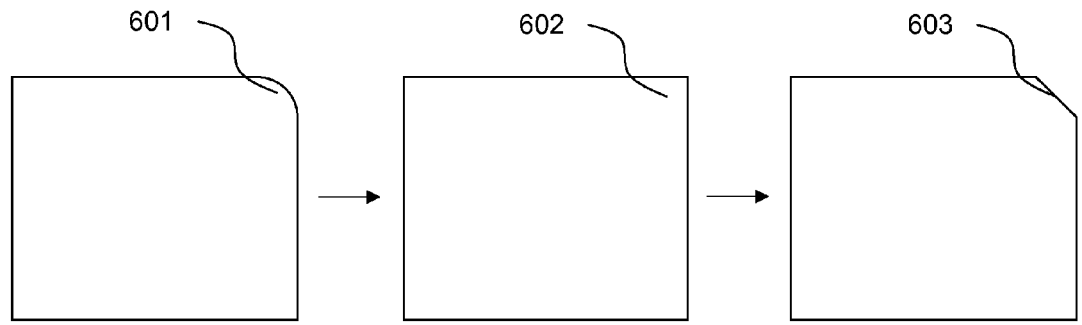
FIG. 6 shows a hierarchical set of geometries wherein a radial segment is identified and modified into a chamfer segment or an angle segment.
Figure 7:
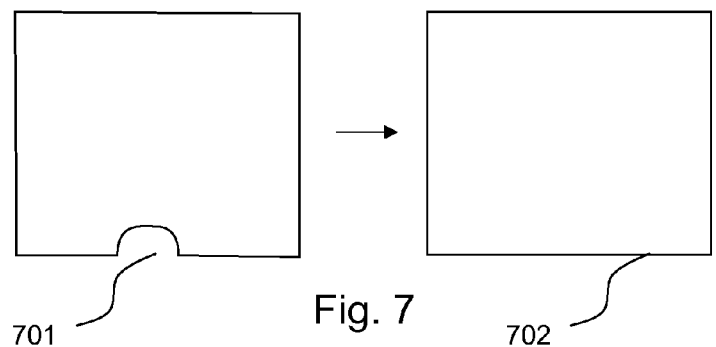
FIG. 7 shows a set of geometries where a cut-out is identified and modified by removing the cut-out.
Figure 8:
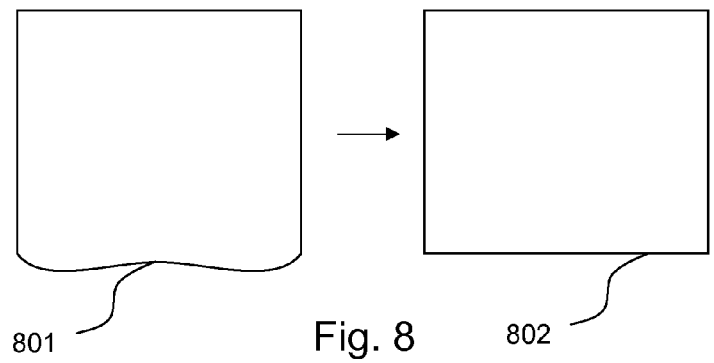
FIG. 8 shows a set of geometries where a non-straight line is identified and modified into a straight line.

Further examples of identification and modification of various segments are shown in FIGS. 6, 7 and 8. In FIG. 6 the example of hierarchical modifications of a radial segment 601 (a) is shown. First it is proposed that the radial segment is modified into an angle 602 (b), in this case a right angle. If this is unacceptable, e.g. from a cutting point of view or from a functional (constructional) point of view, it is proposed to replace the radial segment with a chamfer segment 603 (c). If this is still unacceptable, e.g. from a cutting point of view or from a functional (constructional) point of view, it is proposed to increase the radius of the radial segment to a size that is significantly larger than an influential zone of the beam.

In FIG. 7 another example of a segment in the form of a cut-out 701 is identified and it is proposed to modify the segment by removing the cut-out, e.g. replacing the cut-out 701 with a straight line 702. If this is still unacceptable, e.g. from a cutting point of view or from a functional (constructional) point of view, it is proposed to increase the extension of the cut-out to a size that is significantly larger than an influential zone of the beam.

In FIG. 8 an example of a segment in the form of a non-straight line 801 is identified, and it is proposed to modify the segment by replacing the non-straight line with a straight line 802 whereby the shape may be positioned with only the distance of the width of one cut with the cutting beam to an adjacent part and cut with reliable cutting results.

A system for preparing a cutting path for machine cutting of a plurality of parts from a sheet material using beam cutting technology comprises a processor in a computer which is configured for performing the method disclosed herein.

The computer may be configured for performing the method disclosed herein by executing computer program code, which enables the processor to perform the method.

The computer program code may be comprised in a non-transient computer-readable medium. Thus the non-transient computer-readable medium comprises data representing coded instruction sets configured for execution by a processor in a computer, the instructions comprising the method as disclosed herein.

The system may comprise a beam cutting device and a control unit, wherein the control unit is configured for controlling the beam cutting device according to the cutting path thus prepared.

The invention claimed is:

1. A method of preparing a cutting path for machine cutting of a plurality of parts from a sheet material using beam cutting technology, wherein each one of the plurality of parts is formed by one of a plurality of two dimensional free form shapes, comprising at least a first shape, the method comprising:

identifying at least one segment of the at least one first shape, which segment makes it difficult for a part of the at least one first shape to be positioned and cut so close to another shape in the plurality of shapes so that only one cut of the cutting beam is found between the parts, modifying the segment of the at least one first shape to provide a modified first shape, comprising a modified segment, configured such that the modified segment allows a part of the modified first shape to be positioned and cut so close to another shape in the plurality of shapes so that only one cut of the cutting beam is found between the parts whenever the shape of the parts allows it;

wherein a cutting beam of the machine will have an influential zone that extends on both sides of the cutting beam during cutting, and wherein the identifying of at least one segment that makes it difficult for a part of the at least one first shape to be positioned and cut so close to another shape in the plurality of shapes so that only one cut of the cutting beam is found between the parts involves identifying interference of the influential zone of the cutting path; and wherein the modifying the segment of the at least one first shape to provide a modified first shape involves modifying the segment such that interference of the influential zone is decreased.

2. The method according to claim 1, wherein the at least one segment of the first shape comprises a radial segment having an extension which is smaller than an influential zone of the cutting beam.

3. The method according to claim 1, wherein the at least one segment of the first shape comprises a chamfer segment having an extension which is smaller than an influential zone of the cutting beam.

4. The method according to claim 1, wherein the at least one segment comprises a cut-out having an extension which is smaller than an influential zone of the cutting beam.

5. The method according to claim 1, wherein the at least one segment comprises a non-straight line.

6. The method according to claim 1, comprising a step of proposing the modified segment to an operator before modifying the at least one first part to form the modified first part.

7. The method according to claim 1, wherein a specific segment of a part may be tagged to be protected from influence of an influential zone, and wherein the method will involve a step of ensuring that said segment may be cut with a minimum of such influence.

8. System for preparing a cutting path for machine cutting of a plurality of parts from a sheet material using beam cutting technology, wherein each one of the plurality of parts is formed by one of a plurality of two dimensional free form shapes, comprising at least a first shape, the system comprises:

processing means configured for identifying at least one segment of the first shape, which segment makes it difficult to position and cut the first shape so close to another shape of the plurality of shapes so that only one cut of the cutting beam is found between the parts formed by the shapes, the processing means further being configured for modifying the segment to be able to position and cut the first shape so close to another shape in the plurality of shapes so that only one cut of the cutting beam is found between the parts formed by the shapes whenever the shapes allows it, and providing a cutting path for cutting a cluster of parts formed by free form shapes, comprising at least the first shape with the at least one segment being modified;

wherein a cutting beam of the machine will have an influential zone that extends on both sides of the cutting beam during cutting, and wherein the processing means is configured to identify interference of the influential zone of the cutting path; and wherein the processing means is configured to modify the segment of the at least one first shape such that interference of the influential zone is decreased.

9. System for machine cutting several parts out of a piece of material, comprising a beam cutting device, a control unit, and a system according to claim 8, wherein the control unit is configured for controlling the beam cutting device according to the cutting path thus prepared.

10. A non-transitory computer-readable storage medium comprising a computer program product comprising computer program code, which when executed enables a processor in a computer to perform the method according to claim 1.

11. A non-transient computer-readable medium or media comprising data representing coded instruction sets configured for execution by a processor in a computer, the instructions comprising the method according to claim 1.

* * * * *